United States Patent [19]

Langman et al.

[11] Patent Number: 5,022,020
[45] Date of Patent: Jun. 4, 1991

[54] MULTIPLE PLAY COMPACT DISK PLAYER

[75] Inventors: Kirk Langman, 10515 Tenn. Ave., Los Angeles 90064; Kiran Krishnamurti, 1411 Federal Ave. #5, West Los Angeles 90025; Kenneth A. Tarlow, Marina del Rey, all of Calif.

[73] Assignees: Kirk Langman, Los Angeles; Kiran Krishnamurti, West Los Angeles, both of Calif.

[21] Appl. No.: 393,585

[22] Filed: Aug. 14, 1989

[51] Int. Cl.$^5$ .................. G11B 17/24; G11B 17/22
[52] U.S. Cl. ........................... 369/37; 369/36; 369/191; 369/192
[58] Field of Search ............... 369/36, 37, 178, 191, 369/192, 194, 195, 196, 199

[56] References Cited

U.S. PATENT DOCUMENTS

| 2,386,166 | 1/1943 | Lissiansky | 369/191 |
|---|---|---|---|
| 2,839,305 | 6/1958 | Andres | 369/195 |
| 4,271,489 | 6/1981 | Sirya | 369/38 |
| 4,589,101 | 5/1986 | Schatteman | 369/38 |
| 4,594,700 | 6/1986 | Takahashi | 369/39 |
| 4,599,716 | 7/1986 | Shimbo | 369/36 |
| 4,614,474 | 9/1986 | Sudo | 414/281 |
| 4,633,452 | 12/1986 | Shimbo | 369/39 |
| 4,652,939 | 3/1987 | Baumeister | 358/342 |
| 4,675,755 | 6/1987 | Baumeister | 360/35.1 |
| 4,682,313 | 7/1987 | Miyake | 369/39 |
| 4,734,898 | 3/1988 | Morinaga | 369/39 |
| 4,737,945 | 4/1988 | Yamazaki | 369/36 |
| 4,750,160 | 6/1988 | Miller | 369/37 |
| 4,755,978 | 7/1988 | Takizawa | 369/194 |

Primary Examiner—Benjamin R. Fuller
Assistant Examiner—Larry Moskowitz
Attorney, Agent, or Firm—Poms, Smith, Lande & Rose

[57] ABSTRACT

A multi-play compact disk player having a magazine holding a plurality of discrete programmed compact disks. The magazine remains stationary and a housing in the player is rotated with an arm movable to pick up a preselected one of the disks and move the same to a playing area for playing the same. The player can receive thereon a plurality of stacked magazines, each magazine holding a plurality of compact disks.

21 Claims, 6 Drawing Sheets

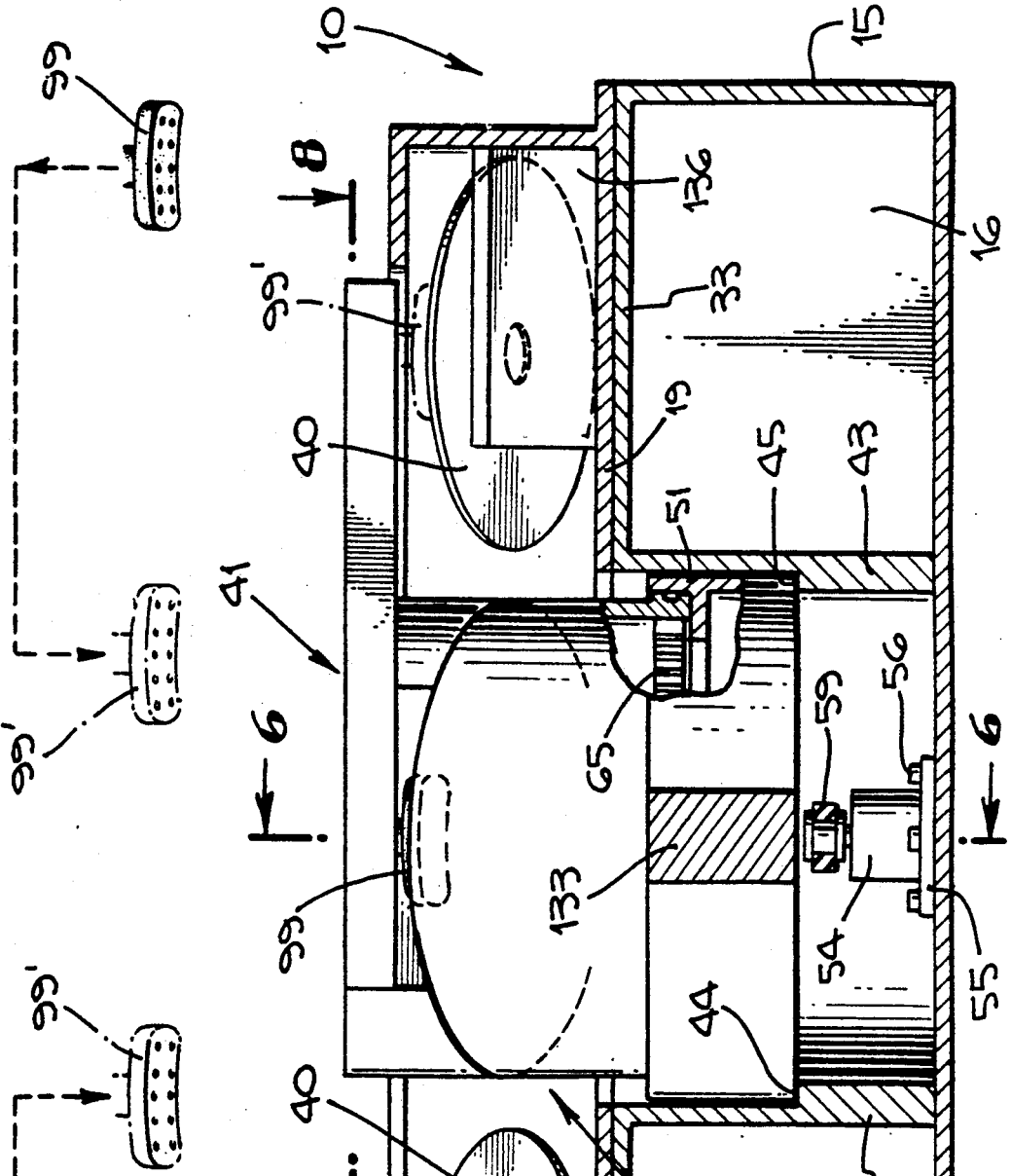

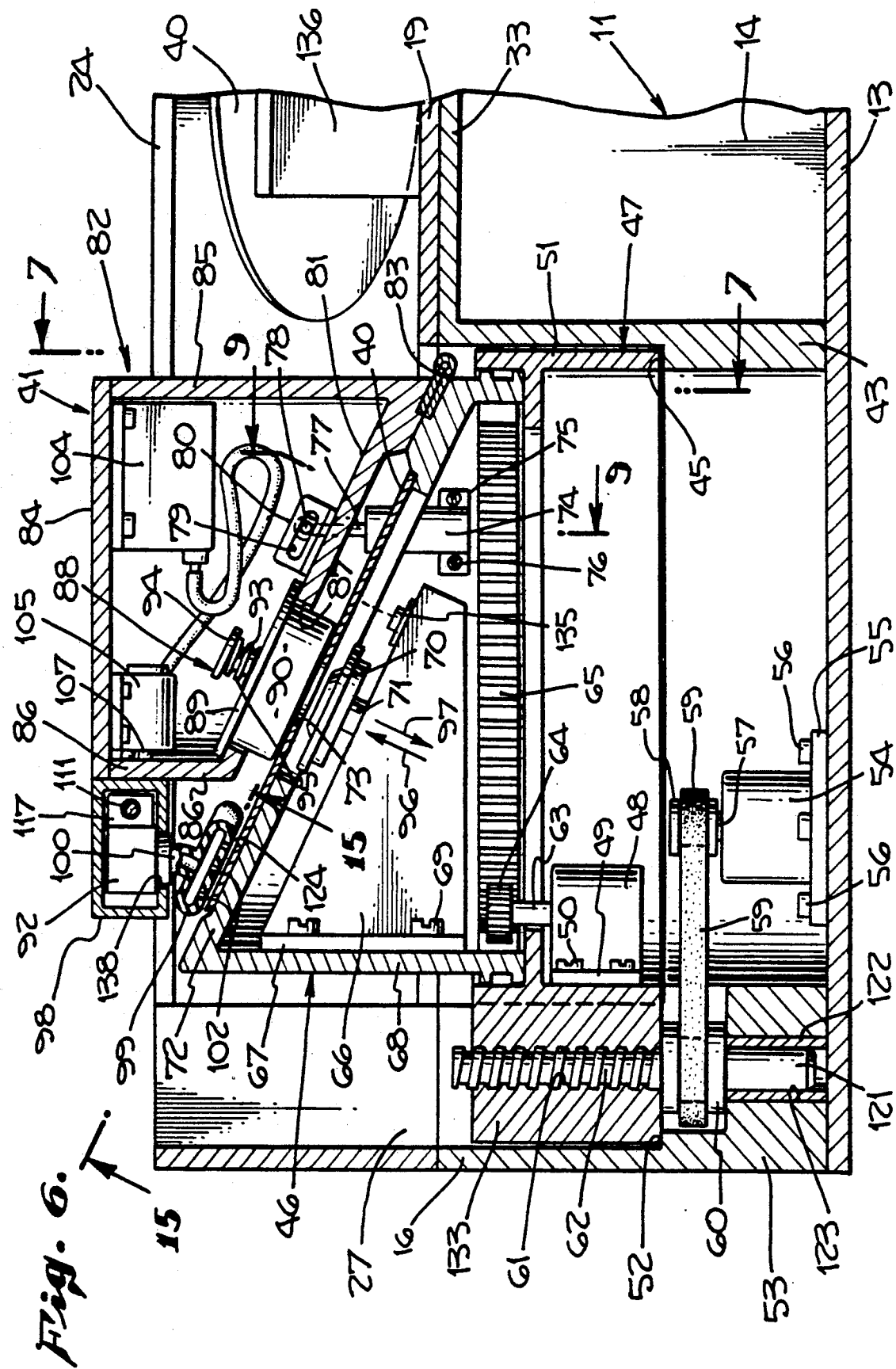

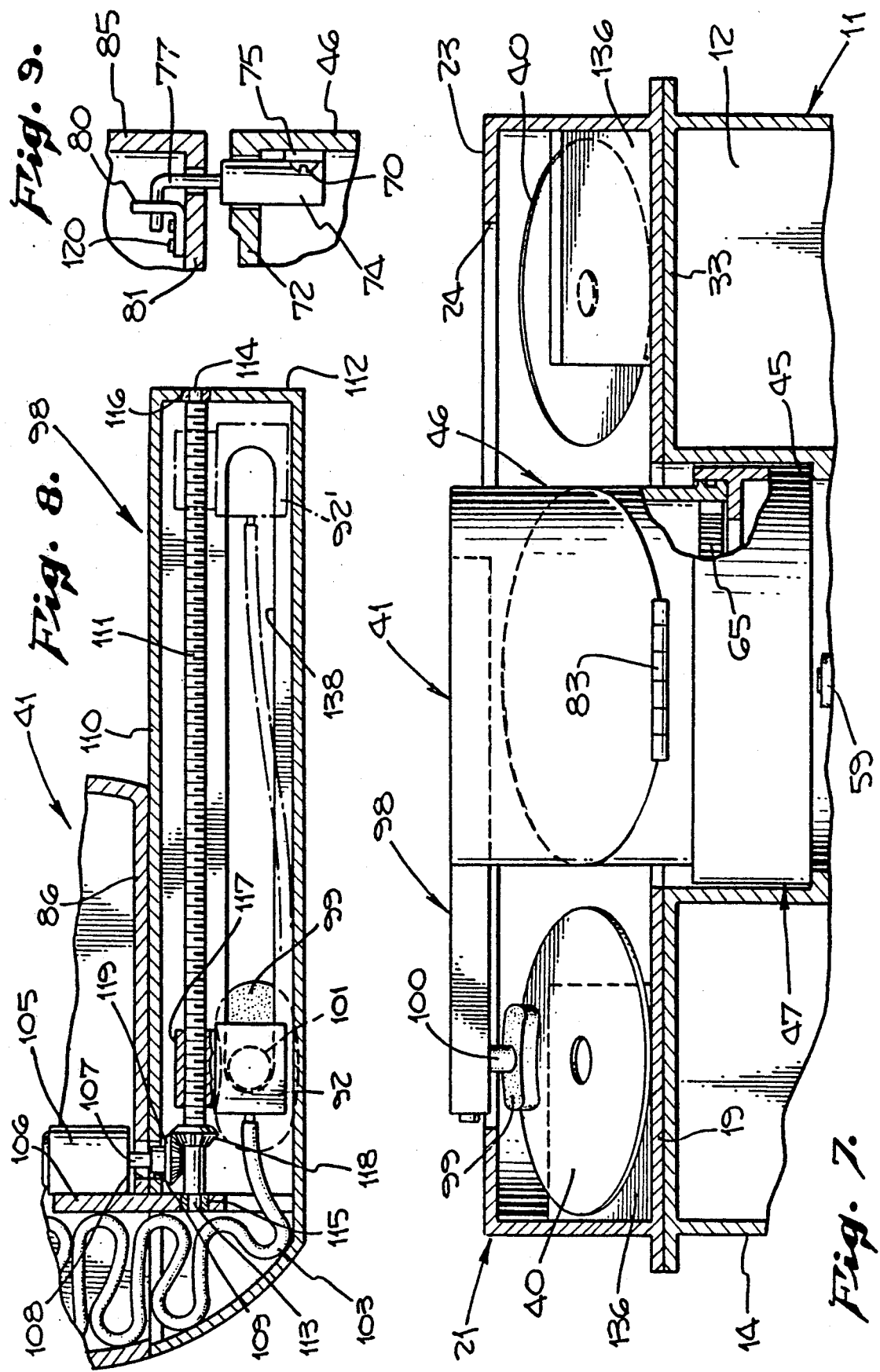

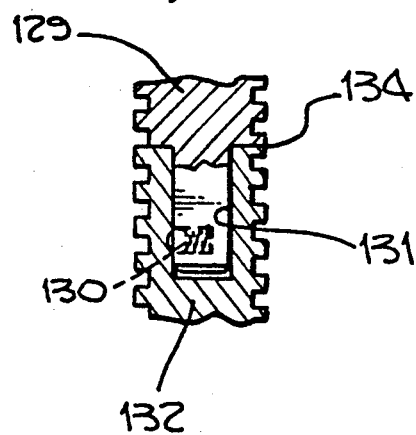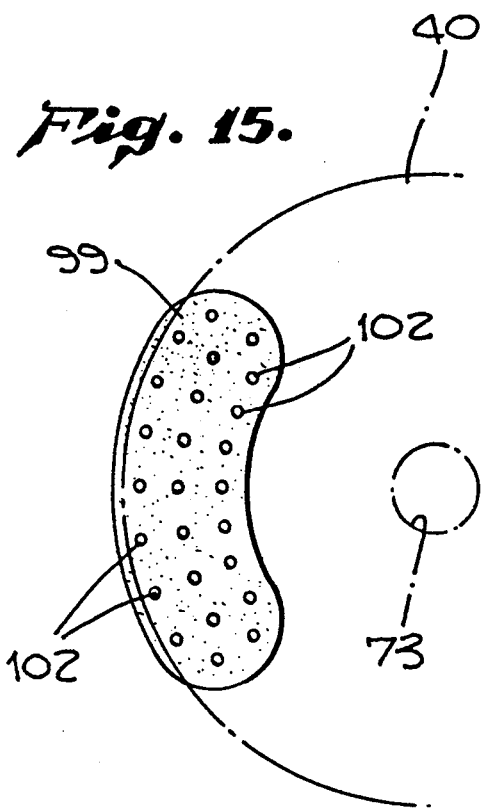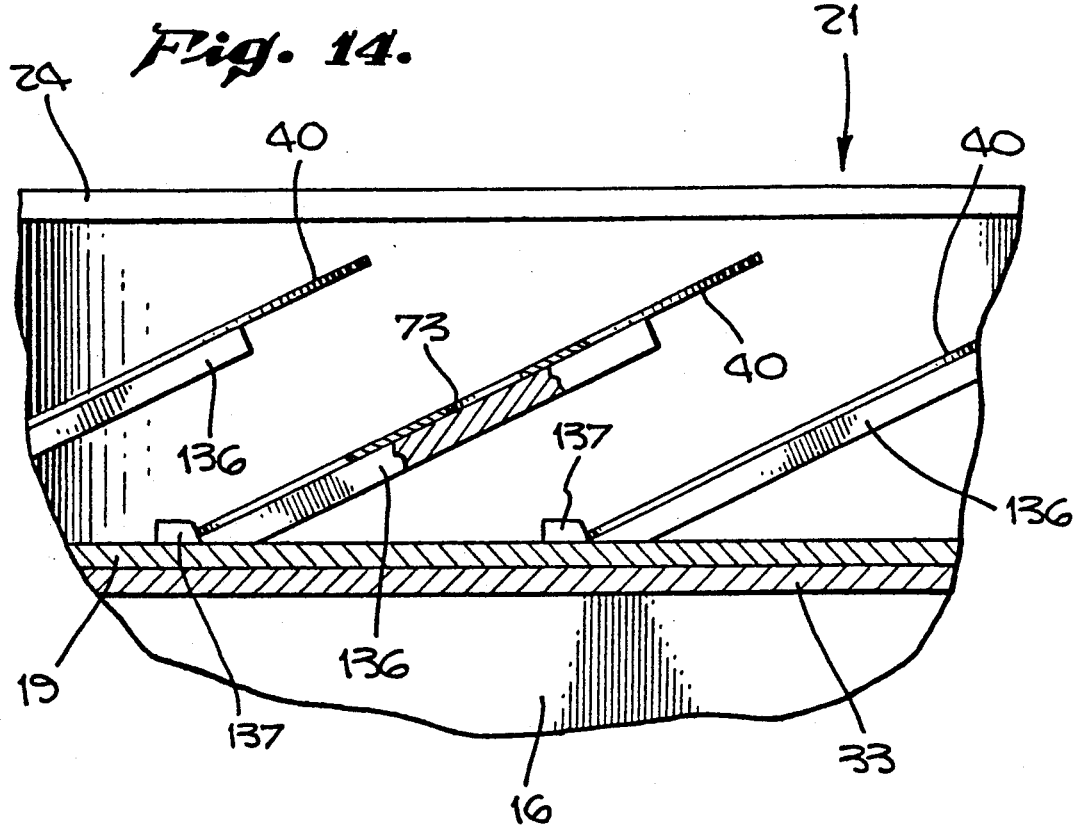

MULTIPLE PLAY COMPACT DISK PLAYER

BACKGROUND OF THE INVENTION

1. Field of the Invention

The invention relates to compact disk players; and, more particularly, to a multi-play compact disk player having stackable magazines thereon, each holding a plurality of compact disks thereon.

2. Description of the Prior Art

In recent years, the field of audio equipment has embraced digital audio playback systems which utilize pulse code modulation technology for playing back sounds recorded on compact disks. Such disks, referred to as CDs, used in such digital audio disk systems are made from resin and have a metal film on at least one surface with pits or depressions formed therein. These pits or depressions reflect light and are read by an optical pickup incorporating a semiconductor laser while the CD rotates.

Due to their increased popularity it has been suggested to provide a CD player adapted to play a plurality of CDs. In U.S. Pat. No. 4,734,898, for example, an autochanger type CD player is disclosed. However, in this changer, the CDs are stacked vertically and complicated mechanism is used to transport the vertically stacked CDs to a playing area, then re&urn the same after playing. The capacity of the tray holding the disks is also limited. In U.S. Pat. No. 4,737,945, a multi-disk player is disclosed wherein the CDs are stacked horizontally in a magazine insertible in the player. Although different magazines can be inserted into the player, they can be inserted only one at a time and each magazine only holds a small number of CDs, such as three. The mechanism for withdrawing these CDs from the magazine and transporting the same to a playing area is also quite complicated and physically clamps the CD. Other similar prior art players have similar deficiencies and are quite expensive and complicated. Thus, such high cost does not allow such players to be competitive in one's home except for "high end" users.

There is thus a need for an inexpensive and easy-to-use multi-play CD player which is programmable, can stack a plurality of magazines holding a plurality of CDs, and which uses a simple system for withdrawing the CD from a storage in a magazine and returning it to the magazine after playing the same. The owner of such a player can insert a plurality of CDs in a magazine, store the same and need never physically touch the stored CD again. This will increase the life of the CD.

SUMMARY OF THE INVENTION

It is an object of this invention to provide an improved inexpensive multi-play CD player.

It is a further object of this invention to provide such a CD player which can accommodate a plurality of magazines, each storing a plurality of CDs.

It is still another object of this invention to provide a CD player which has a relatively simple mechanism for selecting a CD out of a magazine in which it is stored and return it to the same after playing.

It is also an object of this invention to provide a storage for a plurality of CDs without need for ever touching the same again.

These and other objects are preferably accomplished by providing a multi-play compact disk player having a magazine holding a plurality of discrete programmed compact disks. The magazine remains stationery and the player has a rotatable housing with an arm movable to pick up a preselected one of the disks and move the same to a playing area for playing the same. The player can receive thereon a plurality of stacked magazines, each magazine holding a plurality of compact disks. The arm used to pick up the preselected disk has a vacuum at the end to pick up the disk and transport it back and forth. The player is programmable so that different CDs can be played in a preselected order. The CD unit may be made to conventional size dimensions so as to be inserted into a preexisting modular-type high fidelity system.

BRIEF DESCRIPTION OF THE DRAWING

FIG. 3 is a view taken along lines III—III of FIG. 1;

FIG. 4 is a schematic illustration of the movement of the vacuum pickup of the player of FIG. 1;

FIG. 5 is a schematic illustration similar to FIG. 4 illustration the return of the pickup of the player of FIG. 1;

FIG. 6 is a view taken along lines VI—VI of FIG. 3;

FIG. 7 is a view taken along lines VII—VII of FIG. 6;

FIG. 8 is a view taken along lines VIII—VIII of FIG. 3;

FIG. 9 is a view taken along lines IX—IX of FIG. 6;

FIG. 13 is a sectional view of a portion of the apparatus of FIG. 11;

FIG. 14 is a view taken along lines XIV—XIV of FIG. 2; and

FIG. 15 is a view taken along lines XV—XV of FIG. 6.

DESCRIPTION OF THE PREFERRED EMBODIMENT

Figure 1:
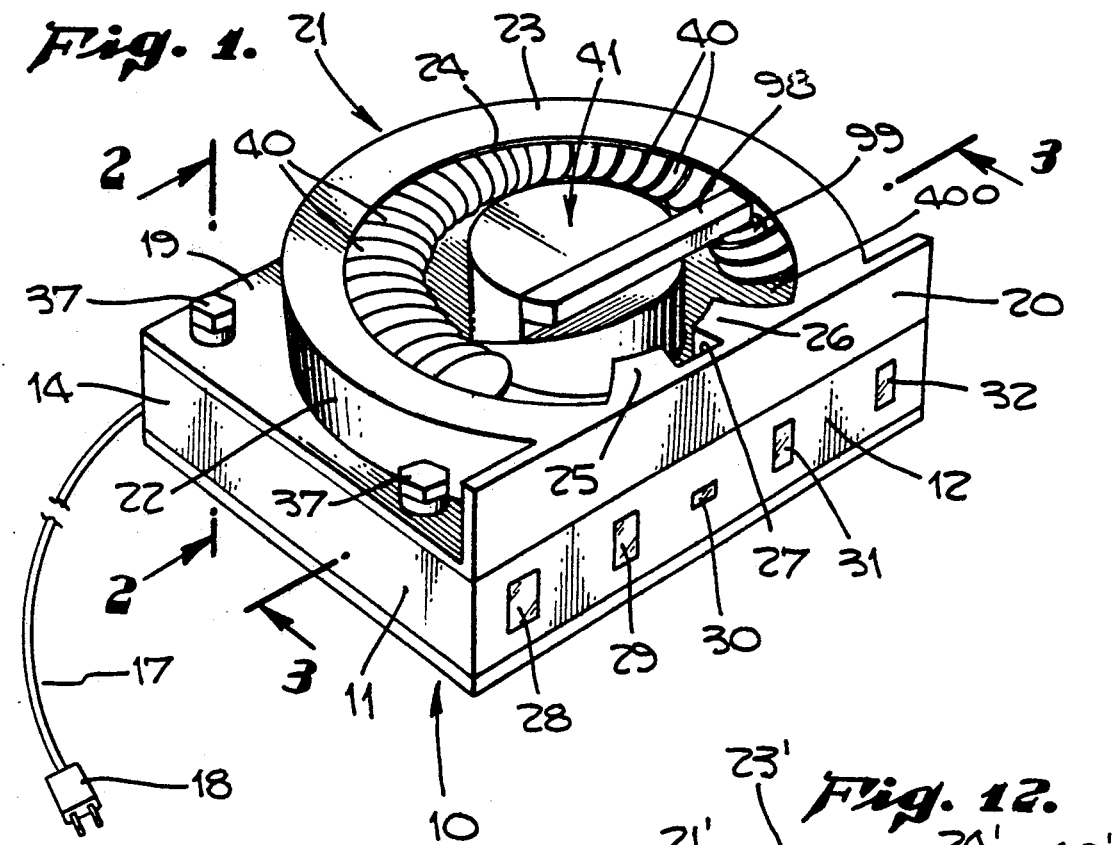
FIG. 1 is a perspective view of the CD player in accordance with the teachings of the invention.

Referring now to FIG. 1 of the drawing, a CD player 10 is shown having a main housing having a front panel 12, a base 13 (FIG. 3), side panels 14, 15 (see FIGS. 1 and 3), rear panel 16 (FIG. 2) and a suitable electrical conduit 17 adapted to be plugged via plug 18 into a suitable source of electricity. Of course, player 10 may be portable, or AC/DC, as is well known in the electronics art.

A top panel 19 closes of the top of housing 11 and has, at its front end, an upstanding panel 20 which is flush with front panel 12. A round housing portion forming a magazine 21 is provided on the top of panel 19 having a peripheral vertical side wall 22, blending into panel 20 as shown, and a top wall 23 surrounding opening 24 in housing portion 21. As seen in FIG. 1, a pair of spaced abutments 25, 26 define a slot 27 therebetween, for reasons to be discussed, abutments 25, 26 having their upper wall portions blending into the remainder of top wall 23 and extending downwardly therefrom.

A plurality of spaced push buttons 28 to 32 are provided in front panel 12 for turning player 10 on and off, selecting a disk, etc., as is well known in the art. Of course, any suitable type or number of buttons may be provided, such as heat sensitive buttons, etc.

Figure 2:
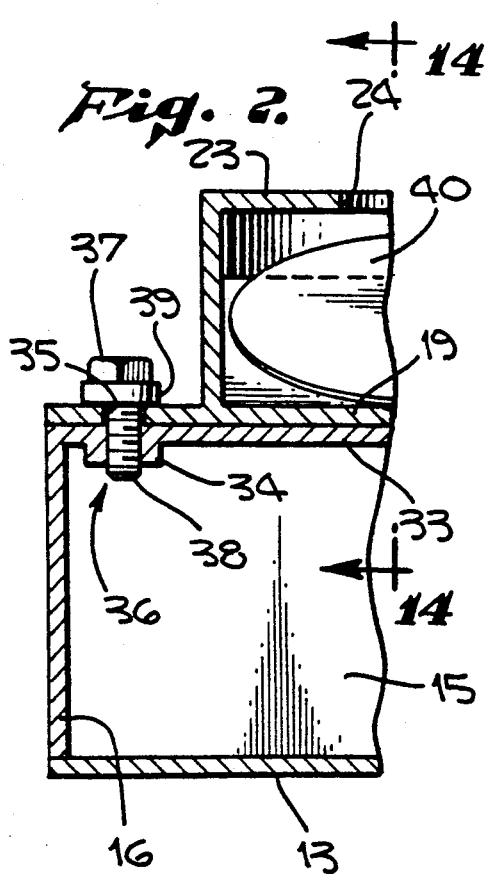
FIG. 2 is a view taken along lines II—II of FIG. 1.

As seen in FIG. 2, top panel 19 is secured to a subpanel 33 closing off the top of front panel 12, side panels 14, 15 and rear panel 16 and may be integral therewith as shown. A threaded boss 34 is provided on the underside of subpanel 33 at each corner thereof, the boss 34 being aligned with a hole 35 in each corner of top panel 19. A threaded bolt 36 is provided at each corner having an enlarged hex head 37 and an integral threaded shaft 38 extending through a suitable washer 39 and threaded into the threaded boss 34.

As seen in FIG. 2, and as will be further discussed hereinbelow, the shaft 38 is longer than necessary.

As seen in FIGS. 1 and 3, a plurality of conventional CDs, such as audio CDs 40, are provided stacked in a slanting array about a central housing 41 and retained in slanting spaced position by slanted spaced partitions 136 (see also FIG. 14) on which the CDs 40 rest, the bottoms abutting against stops 137 on wall 19. Preferably, the angle of slant of CDs 40 (and partitions 136) is about 25° from the horizontal. The CDs 40 are stacked so that a substantial portion of the upper non-recorded surface is exposed again for reasons to be discussed as seen in FIG. 1.

As seen in FIG. 3, a pair of spaced vertical partition walls 42, 43 are provided interiorly of housing 11 extending between subpanel 33 and base 13. An abutment shoulder 44, 45 is provided on each wall 42, 43, respectively, for receiving housing 41 thereon. Of course, partition walls 42, 43 may be one round wall, if desired, with an abutment shoulder thereon.

Housing 41 is divided into two parts, an upper electronics section or playback means 46 (see FIG. 6) and a lower motor section 47. Motor section 47 has a conventional motor 48 having a flange 49 secured via screws 50 to side wall 51 of lower motor section 47. As seen, housing 41 in FIG. 6 also rests on a shoulder 52 of a stepped wall portion 53 of rear panel 16.

Motor section 47 is rotated by a conventional motor 54 having a flange plate 55 secured to base 13 by screws 56. Motor 54 rotates a motor shaft 57 driving a pulley 58 having a resilient belt 59 extending therearound. Belt 59 extends and around a pulley 60 mounted between block 133 (which is a block having a worm gear threaded elongated aperture 61 extending therethrough) and stepped wall portion 53. It is to be understood that pulley 60 is free to rotate between block 133 and wall portion 53 and has a worm gear screw threaded shaft 62 integral therewith and rotated thereby. Threaded shaft 62 has a terminal end 121 at bottom rotatable in bearing 122 mounted in an aperture 123 in wall portion 53. Thus, rotation of shaft 57 via motor 54 and belt 59, rotates pulley 60 to move thread 62 and thus raise and lower motor section 47 and also electronics section 46 resting thereon.

Motor 48 rotates motor shaft 63 having gear 64 connected thereto. Gear 64 in turn meshes with ring gear 65 to rotate playback section 46. Housing 66 within playback means 46 is provided having a flange 67 secured to peripheral side wall 68 of playback means 46 by screws 69. Hub 70 is attached to shaft 71 which rotates CD 40 in place on slanted upper wall 72 of wall playback means 46. Wall 72 has a circular depression forming a turntable portion 124 for receiving a CD 40 therein. Hub 70 is configured to the hole 73 to engage the same and hold CD 40 in position for rotation at high speed via shaft 71 and suitable electronics well known in the art disposed within housing 66.

A conventional solenoid 74 is mounted, via flange 75 and screws 76, to peripheral side wall 68 and has a shaft 77 with a traverse pin 78 at the free end thereof reciprocal within a slot 79 of an L-shaped plate 80 (see also FIG. 9) mounted to bottom wall 81 of a cover 82 via screws 120. Cover 82 is hingedly connected, via hinge 83, to wall 72 of section 46 and has a top or upper wall 84 and a peripheral side wall 85. Wall 81 slants similarly to wall 72 (and, as will be discussed, is at the same angle to the horizontal as the slant of the stored CDs 40) and has a vertical portion 86 extending to upper wall 84. This slant may be an angle of 25°. An opening 87 is provided in wall 81 and a spring biased CD retaining plate 88 is mounted in opening 87. Plate 88 has a flange 89, wider in diameter than opening 87, on the side of wall 81 opposite CD 40 fixed to wall 81. Plate 88 has a cylindrical portion 90 extending through opening 87. Cylindrical portion 90 has a shaft 93 extending through an opening in flange 89 having a stop member 94 at the terminal end thereof. A spring 95 may encircle shaft 93 between stop member 94 and flange 89 normally biasing cylindrical portion 90 toward CD 40. In operation, when hub 70 is moved in the direction of arrow 96 and hub 70 enters opening 73 in CD 40, portion 90 moves adjacent CD 40 and retains the same against hub 70 while the CD 40 is rotated via hub 70 and motor 48. After rotation for the predetermined recorded time, hub 70 moves in the direction of arrow 97 back to the position shown in FIG. 6.

Figure 10:
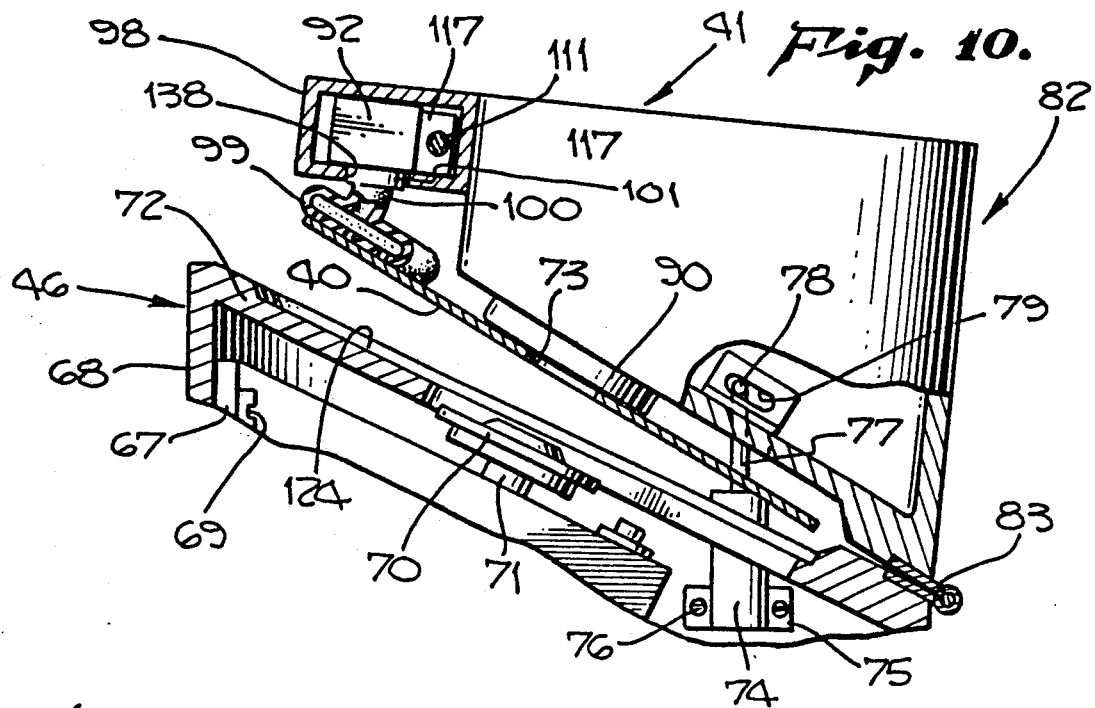
FIG. 10 is a side, partly sectional, view of a portion of the apparatus of FIG. 6 illustrating another position thereof.

Referring again to FIG. 1, a vacuum arm 98 is provided having a vacuum pad 99 (see also FIG. 6) at one end. Arm 98 may be hollow and rectangular in cross-section having a block member 92 reciprocal therein. A bearing member 101 is connected thereto and disposed in the opening 138, and pad 99 may be oval in cross-section with a connecting tube 100 coupling pad 99 to the interior of member 92. A slot 138 (FIG. 8) extends along the bottom of arm 98 with tube 100 extending thereout as seen in FIG. 10. Tube 100 and pad 99 may be of a resilient material, such as rubber, and pad 99 may have one or more spaced holes 102 for allowing air to exit out of pad 99. Air communication to block member 92 and pad 99 is provided by means of an elongated tube 103 (see also FIG. 8) which is coupled to a suitable vacuum chamber 104 (FIG. 5). A motor 105 (FIG. 8) is mounted to a partition wall 106 and has a shaft 107 extending through an opening 108 in wall portion 86 and through a like aligned opening 109 in side wall 110 of vacuum arm 98. An elongated worm gear shaft 111 is journalled between end wall 112 of vacuum arm 98 and partition wall 106 by means of reduced ends 113, 114 journalled within bearings 115, 116, respectively, mounted in walls 106, 112, respectively. Block member 92 has an integral threaded portion 117 receiving shaft 111 therethrough in threaded engagement. A gear 118 is fixed to shaft 111 between end 113 and the threaded portion of shaft 111 whereas a mating gear 119 is fixed to motor shaft 107 for rotation therewith. When motor 105 is actuated to rotate gear 119, gear 118 rotates to rotate shaft 111 with block member 92 movable therealong with tube 100 movable within slot 138 from the solid line position shown in FIG. 8 to the dotted line position 92'.

As seen in FIG. 3, a vertical block member 133 (see also FIG. 1) is provided at the front of housing 41. Block member 133 rides up and down within slot 27 as seen in FIG. 1 to keep housing 41 properly aligned and movable vertically without rotation. A conventional laser 135 (FIG. 6) is provided associated with housing 66, actuated by conventional components internal of housing 66, as is well known in the art.

Figure 12:
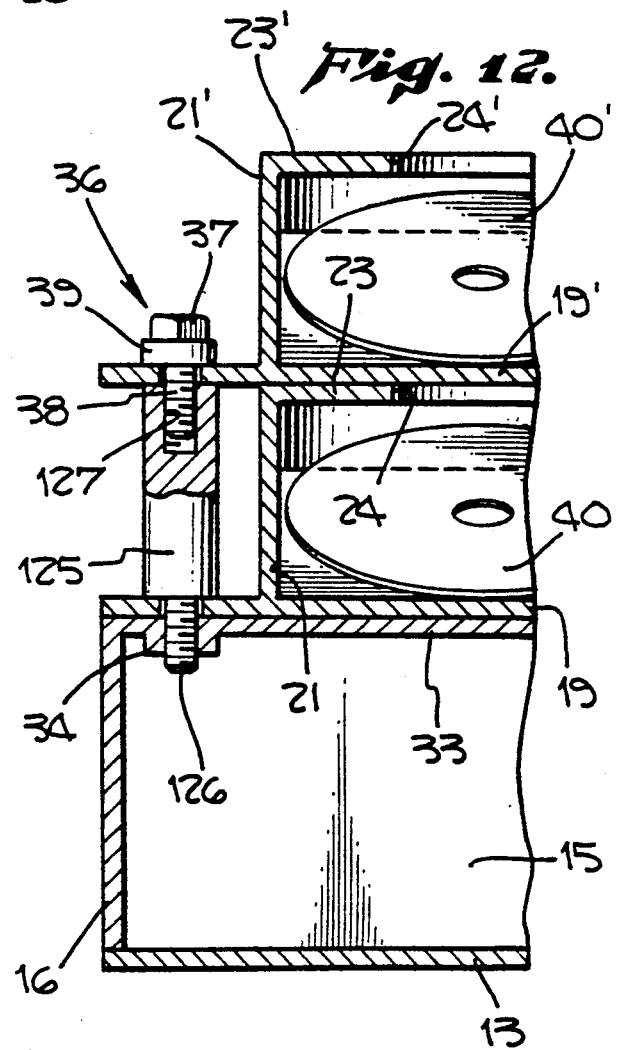
FIG. 12 is a side vertical view, partly in section, similar to FIG. 2, showing another magazine thereon.
Figure 11:
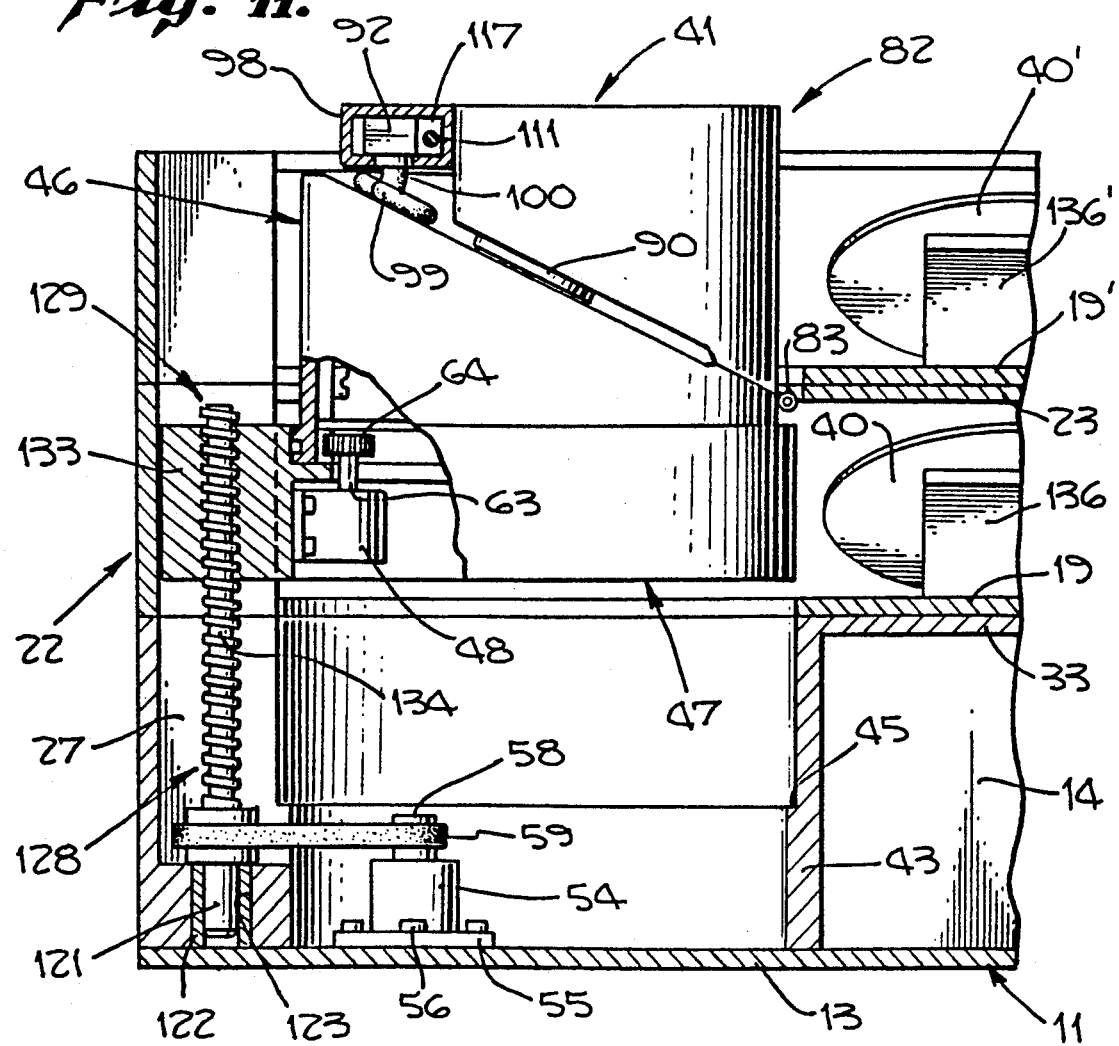
FIG. 11 is a side view, partly sectional, of a stacked version of the CD player of the invention.

Also, as seen in FIG. 15, pad 99 may be crescent-shaped to conform to the like shaped exposed surface (FIG. 1) of the CD 40 to be picked up. Q As seen in FIGS. 11 to 13, wherein like numerals and primed numerals refer to like numerals of the embodiment of FIGS. 1 to 10, a second magazine or round housing 21' can be stacked on top of first housing portion 21 having CDs 40' therein. This is accomplished by removing bolts 36 (FIG. 2) and by inserting spacers 125 having a threaded shaft portion 126 at bottom threaded into the threaded hole in boss 34 and a threaded hole 127 at top receiving therein the threaded shafts 38 of bolts 36. As seen in FIG. 11, central housing 41 stays in the center of the stacked carousels or housing portions 22 and 22' and is moved up and down by the worm gear shaft 128, motor 54, belt 59 and related parts. Shaft 128 is actually comprised of two interconnected shaft portions as seen in FIG. 13. Upper shaft portion 129 has a conventional ball-lock portion 130 receivable in a cavity 131 in lower section 132 as is well known in the ball-lock art. Upper portion 129 is threadably received within block 133 in the manner of the shaft 61 of FIG. 6. The intersection 134 of upper shaft portion 129 and lower sections 132 can be seen in both FIGS. 11 and 13.

In operation, the player 10 is actuated by means of buttons 28 to 32 to turn the player 10 on and select a CD 40 from magazine 21. Solenoid 74 is actuated to raise cover 82. The playing means housing 66 is rotated via motor 48 and gears 63, 65 to rotate housing 66 until the vacuum pad 99 in arm 98 is disposed above the CD 40 selected. Solenoid 74 is now actuated to lower cover 82 so that pad 99 engages the top slanting surface of the CD 40 selected (see FIGS. 3 and 7). Air is sucked out of pad 99 via tube 103 creating a vacuum at pad 99 holding the CD 40 to pad 99 by vacuum. Solenoid 74 is again actuated to pick up cover 82, with CD 40 adhering to pad 99 by vacuum, (see FIG. 10), and pad 99 moves from the dotted line position 99' in FIG. 3 via motor 105 and gears 118, 119 and shaft 111 to the solid line position. This is also shown schematically in FIGS. 4 and 5 wherein pad 99 is first moved from the playing area to the selected CD 40 at dotted line 99' (FIG. 4), then back to the playing area (e.g., from the solid line position 99 in FIG. 5 back to the dotted line position 99' at the playing area). The empty section 400 (see FIG. 1 wherein an empty section 400 is shown in magazine 21) is vertically aligned with a like empty section in magazine 21' to allow vacuum pad 99 to lift to the next level (e.g., magazine 21') without engaging a CD 40' on that next magazine 21'. Cover 82 is now moved by solenoid 74 to the position shown in FIG. 6 with CD 40 in place in turntable portion 124 and air is released from pad 99 out of holes 102 breaking the vacuum and leaving CD 40 in turntable portion 102. At the same time, hub 70 is moved via conventional mechanism interiorly of housing 66 so that hub 70 friction fits into hole 73 of CD 40. Cylindrical portion 90 of holding plate 88 moves adjacent the non-recorded side of CD 40 and hub 70 is rotated at high speed thus rotating CD 40. Laser 135 reads the information recorded on the recorded side of CD 40.

After playing, the hub 70 stops rotating, the inner operating mechanism disengages hub 70 and solenoid 74 is actuated to prepare the player 10 for another cycle. If the stacked magazines 21' and 22' of FIG. 11 are used, housing 41 is merely moved up to the uppermost magazine 21' (after playing the CDs 40 in lower magazine 21, if desired) via motor 54 and screw shafts 129, 132 to play CDs 40' in the upper magazine 21'.

It can be seen that there is disclosed a CD player which can accept a plurality of stacked magazines, each magazine containing a number of CDs, and select such CDs one at a time for playing the same. The player can be actuated remotely by a remote control as is well known in the electronics art. The jackets for the CDs may be kept in an indexed Rolodex-type container. The different magazines allow a large number of CDs to be stored therein, without need for touching them again, then selective magazines can be added to or removed from the player 10 to play the same. Although two such magazines are disclosed, obviously a larger number can be provided with shaft 61 elongated accordingly. Since the magazine does not rotate, the player will fit into a preexisting high fidelity system since there is no need for an extension of the player to accommodate a rotating carousel The front of applicants' player herein is flush and vertical without need for a continuation of the circular housing comprising the magazine since the carousel remains.

Although a particular embodiment of the invention has been disclosed, variations thereof may occur to an artisan and the invention is only to be limited by the scope of the appended claims.

We claim:
1. A multi-compact disk player comprising:
    means for playing back electronic signals recorded on compact disks mounted within said housing having a turntable portion thereon with an aperture therein for receiving a compact disk therein, and a hub adapted to engage a centrally mounted hole in a compact disk when disposed in said turntable portion in a friction-fit manner, said playback means being adapted to move said hub to and from said turntable portion whereby said hub is movable between a first position disposed within the aperture in said turntable portion and, to a second position disposed away from the aperture in said turntable portion;
    a magazine adapted to hole a plurality of compact disks being secured to said main housing, said magazine having spacing means interiorly thereof for maintaining a plurality of compact disks therein spaced from on another and slanted from the horizontal so that, when a plurality of compact disks are disposed within said magazine, said spacing means maintains said compact disks both spaced from adjacent compact disks while exposing an upper surface of said slanted compact disks;
    said magazine having an open central area with said spacing means disposed in a circular array about said open central area;
    rotating means associated with said housing for rotating said playback means;
    a cover pivotally connected to said playback means having a compact disk retaining portion adapted to engage a compact disk disposed in said turntable portion and retain said compact disk in said turntable portion when said cover is lowered to a position adjacent said turntable portion;
    cover raising and lowering means associated with said housing for selectively raising and lowering said cover; and a compact disk pick-up arm associated with said cover having compact disk pick-up means at one end thereof adapted to move from a first position adjacent to said magazine and above the exposed surface of a compact disk when placed in said magazine to a second position adjacent said playback means and above said turntable portion whereby said pick-up means can pick up one of said compact disks disposed in said magazine and move the same to said turntable portion.

2. In the player of claim 1 wherein said magazine is removably secured to said housing.

3. In the player of claim 1 wherein said turntable portion is slanted at the same angle to the horizontal as said spacing means.

4. In the player of claim 3 wherein said spacing means and said turntable portion are slanted at an angle of about 25° with respect to the horizontal.

5. In the player of claim 3 wherein said compact disk engaging portion is slanted at the same angle to the horizontal as said turntable portion and said spacing means when said cover is lowered.

6. In the player of claim 5 wherein said compact disk engaging portion, said spacing means and said turntable portion are slanted at an angle of about 25° with respect to the horizontal.

7. In the player of claim 1 wherein cover raising and lowering means includes a solenoid mounted on said playback means having a solenoid arm with a terminal end movable within a slot mounted in said cover.

8. In the player of claim 1 wherein said compact disk pick up means includes a resilient hollow apertured pad carried by said arm at one end thereof, a vacuum chamber coupled to said pad for selectively creating a vacuum at said pad to adhere a compact disk thereto by vacuum until said vacuum is broken.

9. In the player of claim 8 wherein said pad is moved along said arm by a motor actuated gearing mechanism.

10. In the player of claim 8 wherein said pad is crescent-shaped in plan view.

11. In the player of claim 1 wherein said playback means is vertically movable within said housing and within the open area of said magazine.

12. In the player of claim 1 wherein said magazine is detachably secured to said housing by a plurality of releasable bolts extending through spaced openings in said magazine and threadably receivable in threaded aligned apertures in said housing.

13. In the player of claim 12 wherein a second magazine is detachably secured to and on top of said first mentioned magazine, said first mentioned bolts extending through a plurality of spaced openings in said second magazine into threaded apertures in a spacer disposed between said first and second magazines, each of said spacers having threaded shafts receivable in said first mentioned aligned apertures.

14. In the player of claim 13 wherein said playback means is vertically movable within said housing and within the open areas of said first and second magazines.

15. In the player of claim 14 wherein said playback means is vertically movable by a motor driven vertical worm screw mounted at one end in said housing and at the other end in a block in which said screw is threaded fixed to a subhousing mounted within said housing between said playback means and a centrally mounted cavity within said housing.

16. In the player of claim 15 wherein said subhousing is keyed to said housing for non-rotating vertical movement with respect to said housing.

17. In the player of claim 15 wherein said worm screw includes a first potion threaded into said block and a second portion removably secured to said first portion having the one end of said screw mounted in said housing.

18. In the player of claim 1 wherein said playback means is vertically movable by a motor driven vertical worm screw mounted at one end in said housing and at the other end in a block in which said screw is threaded fixed to a subhousing mounted within said housing between said playback means and a centrally mounted cavity within said housing.

19. In the player of claim 18 wherein said subhousing is keyed to said housing for non-rotating vertical movement with respect to said housing.

20. In the player of claim 1 wherein said spacing means includes a plurality of spaced slanted partitions disposed in a circular array within said magazine.

21. In the player of claim 20 wherein said spacing means includes said magazine having a bottom wall with a plurality of abutment shoulders disposed at spaced locations on a circular array on said bottom wall, each of said abutment shoulders being spaced from a respective partition a distance sufficient to accommodate a slanted compact disk therebetween.

* * * * *